Dec. 1, 1942.   S. J. THOMPSON   2,304,038
LOCKING DEVICE
Filed May 28, 1940

INVENTOR
Stanley J. Thompson
BY
HIS ATTORNEY

Patented Dec. 1, 1942

2,304,038

UNITED STATES PATENT OFFICE 2,304,038

LOCKING DEVICE

Stanley J. Thompson, Plainwell, Mich., assignor to Ingersoll-Rand Company, New York, N. Y., a corporation of New Jersey Application May 28, 1940, Serial No. 337,583

1 Claim. (Cl. 287—119)

This invention relates to locking devices, and more particularly to a locking device for securing two telescopically arranged members together.

One object of the invention is to enable the members to be locked together and released from each other in a simplified manner.

Other objects will be in part obvious and in part pointed out hereinafter.

Figure 1:
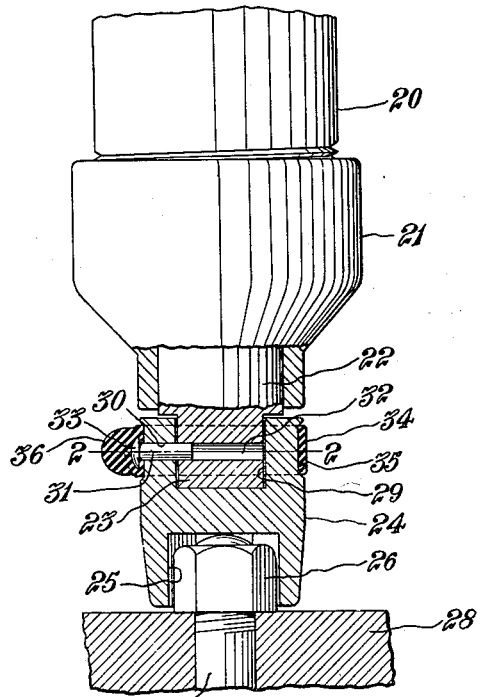
Figure 2:
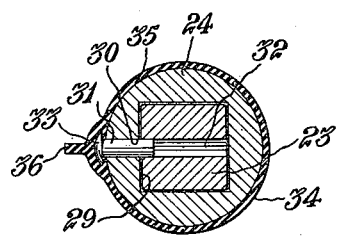

In the drawing accompanying this specification and in which similar reference numerals refer to similar parts, Figure 1 is an elevation, partly in section, of a portion of a rotary tool and a working implement attached thereto by a locking device constructed in accordance with the practice of the invention, and Figure 2 is a transverse view taken through Figure 1 on the line 2—2.

Referring more particularly to the drawing, 20 designates the barrel of a rotary tool and 21 a front head which is threadedly connected to the barrel 20 and contains a rotary driving member 22 having a reduced extension 23 for engagement with a working implement 24.

The working implement is illustrated as a wrench and has a socket 25 to accommodate a nut 26 intended to be threaded upon a bolt 27 arranged in a plate 28.

The extension 23 is shown as being of rectangular shape and extends into a recess 29 of similar shape to avoid, in the construction shown, relative rotary movement between the working implement 24 and the driving member 22. In the wall defining the recess 29 is an aperture 30 to slidably receive a plunger 31 that extends into an aperture 32 in the extension 23 and registering with the aperture 30.

The plunger 31 is preferably in the form of a round pin and carries a head 33 that is embedded in the wall of an endless band 34 lying in an annular groove 35 in the periphery of the working implement 24. The band 34 is constructed of extensible material, as for example rubber, and has a grip member 36 adjacent the plunger 31 for withdrawing the plunger from the aperture 32 to release the working implement from the driving member 22.

In the operation of the device, whenever it is intended to remove the working implement 24 from the driving member 22 the plunger 31 is removed from the aperture 32 by pulling on the grip member 36. The working implement may then be conveniently removed from the driving member.

Likewise, when placing the working implement on the driving member the pin is withdrawn from the recess 29 and the elastic band 34 is thereby placed under tension. When the working implement 24 is in a position in which the apertures 30 and 32 are in registry, the grip member 36 is released and the elastic band will snap the plunger 31 into locking engagement with the driving member 22.

I claim:

A locking device, comprising a band of extensible material, a plunger on the inner surface of the band, a head on the plunger embedded within the band, and a grip member on the outer surface of the band adjacent the head for stretching the band.

STANLEY J. THOMPSON.